United States Patent
Zhang

(10) Patent No.: US 11,898,034 B2
(45) Date of Patent: Feb. 13, 2024

(54) HOMOGENEOUS SHEET EXCLUDING POLYVINYL CHLORIDE

(71) Applicant: AHF, LLC, Mountville, PA (US)

(72) Inventor: Water Zhang, Suzhou (CN)

(73) Assignee: AHF, LLC, Mountville, PA (US)

( * ) Notice: Subject to any disclaimer, the term of this patent is extended or adjusted under 35 U.S.C. 154(b) by 0 days.

(21) Appl. No.: 18/093,506

(22) Filed: Jan. 5, 2023

(65) Prior Publication Data
US 2023/0220199 A1 Jul. 13, 2023

Related U.S. Application Data

(63) Continuation of application No. 17/758,506, filed as application No. PCT/US2021/012557 on Jan. 7, 2021.

(60) Provisional application No. 62/958,304, filed on Jan. 7, 2020.

(51) Int. Cl.
| | |
|---|---|
| *B29C 48/00* | (2019.01) |
| *C08L 75/06* | (2006.01) |
| *B29K 75/00* | (2006.01) |
| *B29K 509/08* | (2006.01) |
| *B29L 31/00* | (2006.01) |

(52) U.S. Cl.
CPC .......... *C08L 75/06* (2013.01); *B29C 48/0011* (2019.02); *B29K 2075/00* (2013.01); *B29K 2509/08* (2013.01); *B29K 2995/0016* (2013.01); *B29L 2031/732* (2013.01)

(58) Field of Classification Search
None
See application file for complete search history.

(56) References Cited

U.S. PATENT DOCUMENTS

| | | | | |
|---|---|---|---|---|
| 5,244,942 A | * | 9/1993 | Hover | C08K 3/013 524/427 |
| 2018/0044925 A1 | * | 2/2018 | Koh | B32B 9/002 |
| 2018/0291229 A1 | * | 10/2018 | Johansson | E04F 13/18 |

FOREIGN PATENT DOCUMENTS

| | | |
|---|---|---|
| CN | 105385089 B | 9/2017 |
| CN | 110437605 A | 11/2019 |
| KR | 20140023663 A | 2/2014 |
| WO | 2016023914 A1 | 2/2016 |

OTHER PUBLICATIONS

International Search Report for International Patent Application No. PCT/US2021/012557 dated Mar. 17, 2021.

* cited by examiner

*Primary Examiner* — Mohammad M Ameen
(74) *Attorney, Agent, or Firm* — Budzyn IP Law, LLC

(57) ABSTRACT

Included is a homogeneous sheet, which excludes polyvinylchloride. The sheet includes a polyurethane, a synthetic rubber blend, and a filler. The synthetic rubber blend may include a pre-mix of a synthetic rubber and white oil.

16 Claims, 1 Drawing Sheet

Raw materials Blended and plasticated schematic diagram
1. high speed mixer, 2. double screw extruder, 3. Roll Raw materials Blended and plasticated schematic diagram
1. high speed mixer, 2. double screw extruder, 3. Roll Crush and consolidate schematic diagram
4. Pulverizer, 5. Pre-heat oven, 6. Roll, 7. Roll

HOMOGENEOUS SHEET EXCLUDING POLYVINYL CHLORIDE

BACKGROUND OF THE INVENTION

Field of the Invention

Included are compositions and methods for preparing a homogeneous sheet. The sheet is suitable for flooring or wall coverings and is prepared without the addition of polyvinyl chloride (PVC).

Summary of Related Art

Homogeneous sheet products are frequently based on polyvinyl chloride (PVC). Alternatives to PVC may be desired due to the inclusion of plasticizers, which may have unfavorable effects. US Patent Application Publication No. 2018/0291229 A1 to Johansson et al. (Johansson) discloses a halogen-free homogeneous surface covering. The composition includes a specific thermoplastic elastomer combined with a thermoplastic polyurethane.

SUMMARY OF THE INVENTION

Some embodiments provide compositions and methods for preparing homogeneous compositions, which may be formed into films or sheets, which overcome deficiencies of Johansson. This is accomplished by providing a sheet or film suitable for floor or wall coverings with properties especially suitable for flooring. The homogeneous compositions are prepared without the addition of polyvinyl chloride (PVC). Therefore, the films and sheets prepared from these compositions exclude PVC.

A method for preparing a homogeneous sheet includes providing sheet components including a thermoplastic polyurethane, a synthetic rubber blend, and a filler; combining the sheet components; extruding the sheet components through a die or calender into a film and cooling. The sheet may be in the form of either a film or a sheet depending on the desired thickness. The film or sheet may be subsequently granulated and combined with sheets or films having different compositions or different additives to provide other properties or appearance.

An additional method for preparing a homogeneous sheet includes:
(a) providing sheet components including a thermoplastic polyurethane, a synthetic rubber blend, and a filler;
(b) combining the sheet components;
(c) extruding the components through a calendar into a film and cooling;
(d) granulating the film to form chips;
(e) blending the chips and transferring to a carrier;
(f) providing heat and consolidating said chips to form a sheet. The sheet may have a thickness of about 0.3 mm to about to 4 mm.

Also provided are an essentially PVC-free flooring sheet or tile including a pre-blend of a synthetic rubber and white oil, a thermoplastic polyurethane, a filler, and at least one functional additive.

BRIEF DESCRIPTIONS OF THE DRAWINGS

DETAILED DESCRIPTION

Figure 1:
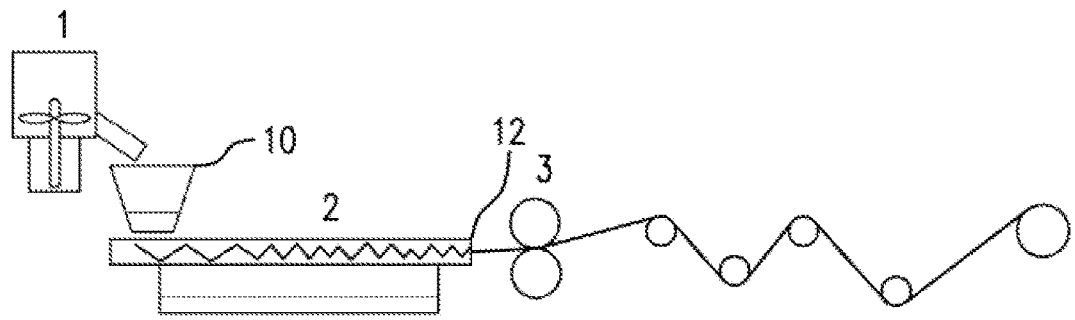
FIG. 1 is a schematic of a method for preparing a sheet of certain embodiments from raw materials.

An important aspect is the inclusion of the pre-blend of synthetic rubber and white oil. This pre-blend permits a greater inclusion of the synthetic rubber into the polyurethane allowing for greater alteration of the sheet properties such as hardness.

The sheet or film of some embodiments may also be combined with a decorative layer. The optional decorative layer may be a direct print, a film or a veneer. These may also be combined with an adhesive. Alternatively, the sheet or film may be itself decorative, by combining chips from two or more sheets or films. Where multiple colors are desired, a first sheet with a first pigment may be formed into chips, which are subsequently combined with chips from second sheet having a different pigment. Combinations of three, four or five, etc. colors may be formed into chips and combined to provide a variety of different visuals for the final sheet.

When a film is desired, the thickness may be in any suitable range such as about 0.1 mm to about 1.5 mm. This film may be suitable as a homogeneous covering on its own, or may be granulating and combined with other granulated films of the same or different compositions to form additional sheets. If the film is to be a sheet, such as sheet flooring in a direct extrusion, the thickness may be any suitable thickness such as about 0.3 mm to about 2.0 mm. When a film is granulated to chips and optionally added to other granulated films and consolidated to form a sheet, this sheet may have any desirable thickness such as about 1.0 mm to about 4.0 mm.

Polyurethanes are a class of materials which are prepared typically by combining three classes of precursor subunits: (1) one or more long chain polyols; (2) one or more polyisocyanates; and (3) one or more chain extenders, short chain molecules containing two or more active hydrogen-containing groups capable of reacting with isocyanate groups, such as a diol. Long-chain polyols (1) are polyhydroxy compounds derived from polyesters, polyethers, polycarbonates, or mixtures thereof. Suitable polyethers include polyethylene glycols, polypropylene glycols, polytetramethylene glycols, or copolymers of these materials. Suitable polyesters may be prepared from dicarboxylic acids having 2 to 12 carbon atoms and polyhydric alcohols containing 2 to 10 carbons which contain two or more active hydroxyl groups per molecule. The polyurethane may have a number average molecular weight of about 20,000 to about 200,000 or about 20,000 to about 50,000. Suitable flow point temperatures include from about 120° C. to about 220° C., about 155° C. to about 180° C., and about 150° C. to about 200° C. A thermoplastic polyurethane having a flow point temperature of about 150° C. to 220° C. is also useful.

Polyisocyanates (2) may be alipahatic, cycloaliphatic, or aromatic such as hexanediisocyanate, isophorone diisocyanate, cyclohexane diisocyanate, diphenylmethane diisocyanate, phylene diisocyanate, napthalene diisocyanate, as well as tri or higher isocyanates, containing two or more reactive isocyanate groups per molecule. Chain-extenders (3) are short chain molecules containing two or more active hydrogen compounds capable of reacting with isocyanate groups. Examples of chain-extenders include, but are not limited to, glycerol monoallylether, trimethylene glycol monoallyl ether, glycerol monolineolate, and similar compounds. The various subunits may be combined sequentially or simultaneously in processes that are known to the art.

Polyurethanes are conventional to the art and may be synthesized by a number of known procedures whereby compounds of types 1, 2, and 3 are combined under controlled conditions of temperature and mixing. Polyurethanes may be substantially crystalline, semi-crystalline or substantially amorphous according to the nature and relative proportion of the three subunit types.

The synthetic rubber blend is a pre-blend of the white oil and synthetic rubber. This pre-blend may be prepared by any suitable method. One method includes combining the synthetic rubber and white oil in a high-speed mixer and mixing for a suitable time to prepare the pre-blend. The pre-blend may be present in any suitable about such as about 0.01% to about 20% by weight of the sheet components. The ratio of white oil to synthetic rubber may be any suitable amount. An example of a suitable amount includes a ratio of white oil to synthetic rubber of about 0.1% to about 300%.

White oil is also known as liquid paraffin wax, which is a highly refined mineral oils with characteristics of extremely pure, stable, colorless, odorless, non-toxic and chemically inert. These attributes make them perfect for any application that values these properties, such as pharmaceuticals, cosmetics and chemical processing.

The synthetic rubber may be any of those well-known in the art. The synthetic rubber may be a block copolymer or terpolymer derived from monomers including a styrene monomer. Non-limiting examples include SBS rubber elastomer, synthetic rubber, polymeric elastomer SIBS, SEBS synthetic rubber, polymeric elastomer, polymeric elastomer SEPS synthetic rubber, natural rubber, styrene-butadiene rubber, butyl rubber, butadiene rubber, fluororubber, silicone rubber, and combinations thereof.

A filler may be included among the sheet components. The form of the filler may be fiber, powder, beads, and combinations thereof. Non-limiting examples of suitable fillers include fillers selected from the group limestone, talc, mica, wollastonite, kaolinite, mica, glass fiber, glass bead, and combinations thereof. Typically, the filler will not interact with the composition or provide a benefit in the manner that a functional additive would. The filler may be present in an amount of about 20% to about 60% by weight of the sheet components. The filler size may be any suitable size such as about 30 mesh to about 8000 mesh. Others suitable filler size ranges include 100 mesh to about 5000 mesh. Other suitable ranges of filler size may be included.

A functional additive will be one that provides an additional benefit to the sheet or will interact with the other sheet components. Non-limiting examples of functional additives may be selected from the flame retardants, antioxidants, heat stabilizers, light stabilizers, process aids, pigment, luminous additives (those that may "glow" in the dark), and combinations thereof.

The flame retardant may include at least one flame retardant selected from solid flame retardants, liquid flame retardants, and combinations thereof. Non-limiting examples of flame retardants include alumina trihydrate (ATH), melamine, melamine cyanurate, ammonium polyphosphate, melamine pyrophosphate, hypophosphite, phenoxy hypophosphite, phenoxy cyclotriphosphazene; bisphenol-A diphosphate (BDP), tetraphenyl resorcinol bis (diphenyl phosphate) (RDP), magnesium hydroxide and combinations thereof.

The heat applied during different aspects of the processes may be any suitable processes as known in the art. These include, but are not limited to, the following approximate ranges:

First oven −140° C. to 240° C.
First calender roll −70° C. to about 100° C.
Second oven 140° C. to 240° C.
Second calender 60° C. to about 100° C.

EXAMPLE

A charge oil pre-blend including the rubber and white oil was prepared by combining 60 kg synthetic rubber materials and 40 kg white oil to a high speed mixer. These were mixed for one to two minutes.

The components in Table 1, were combined as described below to prepare a homogenous sheet or film. In this example, the film was further processed into chips and consolidated with chips of other colors to provide a sheet having a visual with more than one discernable color.

TABLE 1

| | Weight (kg) |
|---|---|
| Thermoplastic polyurethane (WHT-1190) | 34.9 |
| Charge oil styrene -ethylene-butylene-styrene TAIPOL SEBS 6152(synthetic rubber) | 15.2 |
| Talc (2500 mesh) | 20.8 |
| Aluminum hydroxide (325 mesh) | 15.0 |
| Melamine Pyrophosphate | 11.0 |
| Antioxidant blend (Irganox1010 and Irganox 168; Irganox 1010:Irganox 168 = 1:1) | 1.0 |
| Tinuvin UV 770 | 0.6 |
| Silicone oil | 1.5 |

The components in Table 1 were prepared into a sheet included a process shown in the schematic of FIG. 1. The thermoplastic polyurethane, charge oil, talc, aluminum hydroxide, melamine pyrophosphate, antioxidant blend, Tinuvin UV 770 and silicone oil were measured and added to a high speed mixer 1. The materials were blended for 3-5 minutes prior to discharge into an extruder hopper 10, to which 2% by weight a blue pigment was added. The materials were combined in a double screw extruder 2 at 150-200° C. then extruded through a flat die 12 and cooled on a roll 3. After cooling the thin blue sheet, the sheet was granulated into small chips. These blue chips are designated A1.

The process above was repeated with the substitution of the pigment. The pigment was replaced with a 1% blue pigment. This film was also granulated to small chips. These light blue chips are designated A2.

The process above was conducted a third time with the substitution of the pigment. The pigment was replaced with a 2% gray pigment. This film was also granulated to small chips. These gray chips are designated B1.

The process above was conducted a fourth time with the substitution of the pigment. The pigment was replaced with a 1% yellow pigment. This film was also granulated to small chips. These yellow chips are designated B2.

Figure 2:
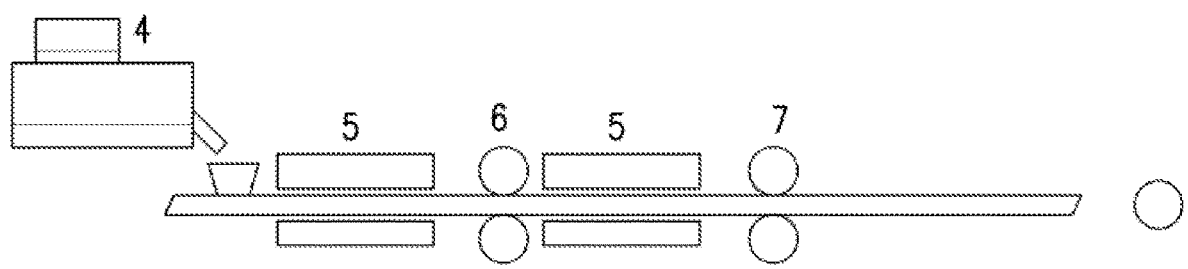
FIG. 2 is a schematic to prepare a sheet from pellets derived from the process in FIG. 1.

Referring to FIG. 2, the chips are then consolidated in the following proportion A1:A2:B1:B2=30:30:30:10. These chips are blended in a mixer and transferred to consolidation equipment. The chips are transferred to a hopper of a consolidation line. The uniform mixture of chips optionally passes through an oven (not shown) prior to pressing at rolls 6. The composition then passed through an oven 5 at a temperature of 220-230° C. at a line speed of 10 m/min and finally pressed at rolls 7 to a homogeneous sheet of thickness 2 mm.

The Comparative Example was made according to the disclosure of US20180281229 including a thermoplastic elastomer 20%, thermoplastic polyurethane 25%, compatibilizer 5%, filler 44%, silicone 3%, antioxidant 0.3%, Lubricant 1.6%, and Pigment 1. These materials were melt-mixed in an extruder a temperature of about 170° C., delivering a single-colored compound in strand form. Table 2 provides properties comparing the inventive composition with commercially available rubber flooring and a comparative from US Patent Application Publication No. 2018/0291229 ('299 application).

TABLE 2

| Property | Test method | Inventive Composition | Rubber (commercial) | Comparative Example '229 application |
|---|---|---|---|---|
| Dimensional stability % | EN434 | 0.11 | 0.25 | — |
| Wear group | EN660 | T | P | — |
| Residual indentation, mm | EN433 | 0.05 | 0.07 | — |
| Flexibility | EN435 | Pass under−20° C. 6.35 mm @mandrel test | Pass under 0° C. 6.35 mm@mandrel test | — |
| Fire retardant | GB/T8624 | B1-fl | C | B1-fl |
| Critical flux, K W · m−2 | ASTM E648 | ≥11 | ≥4.5 | ≥4.5 |
| Smoking production % | GB/T8624 | 120(≤200) | ≤750 | ≤750 |

The inventive composition provided lower smoke production than the Comparative Example, which is advantageous, especially for commercial use.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

The invention claimed is:

1. A method for preparing a homogeneous sheet or film comprising:
   (a) providing sheet components including a thermoplastic polyurethane, a synthetic rubber blend, and a filler;
   (b) combining the sheet components with a first pigment;
   (c) extruding said combined sheet components of step (b) through a die or calendar to form a first colored film;
   (d) with the first colored film cooled, granulating the cooled first colored film into first single-colored chips;
   (e) combining the sheet components with a second pigment;
   (f) extruding said combined sheet components of step (e) through a die or calendar to form a second colored film;
   (g) with the second colored film cooled, granulating the cooled second colored film into second single-colored chips;
   (h) blending at least a portion of the first single-colored chips with at least a portion of the second single-colored chips, and optionally other components, to form a uniform mixture;
   (i) heating the mixture;
   (j) consolidating the heated mixture to form the homogeneous sheet or film.

2. The method of claim 1, wherein said homogeneous sheet or film is sheet flooring having a thickness of about 0.1 mm to about to 4.0 mm.

3. The method of claim 1, wherein said homogeneous sheet or film is sheet flooring having a thickness of about 0.1 mm to about 2.0 mm.

4. The method of claim 1, wherein said homogeneous sheet or film is combined with a decorative layer.

5. The method of 1, wherein said consolidating includes pressing followed by annealing and cooling.

6. The method of claim 5, wherein a coating is added after consolidation and before annealing.

7. The method of claim 1, wherein said thermoplastic polyurethane is derived from a polymer selected from a polyester, a polyether, and combinations thereof.

8. The method of claim 7, wherein said thermoplastic polyurethane is present in an amount of about 20% to about 60% by weight of the sheet components.

9. The method of claim 1, wherein said synthetic rubber blend comprises a block copolymer or terpolymer derived from monomers including a styrene monomer.

10. The method of claim 9, wherein said synthetic rubber blend is a pre-blend prepared from a synthetic rubber and white oil.

11. The method of claim 1, wherein said filler is selected from the group consisting of limestone, talc, mica, wollastonite, kaolinite, mica, glass fiber, glass bead, and combinations thereof.

12. The method of claim 11, wherein said filler is present in an amount of about 20% to about 60% by weight of the sheet components.

13. The method of claim 1, wherein said sheet components further comprise at least one functional additive selected from the group consisting of flame retardants, antioxidants, heat stabilizers, light stabilizers, fluorescent or phosphorescent additive, luminous additives, process aids, pigment and combinations thereof.

14. The method of claim 13, wherein said flame retardants include at least one flame retardant selected from group consisting of solid flame retardant, liquid flame retardant, and combinations thereof.

15. The method of claim 1, wherein the first and second pigments are different.

16. The method of claim 15, wherein the first and second pigments are different in one or both of: color and concentration.

* * * * *